United States Patent
Hull et al.

(10) Patent No.: US 11,174,178 B2
(45) Date of Patent: Nov. 16, 2021

(54) TREATING SEAWATER FOR OILFIELD OPERATIONS

(71) Applicant: Saudi Arabian Oil Company, Dhahran (SA)

(72) Inventors: Katherine Leigh Hull, Houston, TX (US); Brent Cooper, Stafford, TX (US); Ghaithan A. Al-Muntasheri, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/723,722

(22) Filed: Dec. 20, 2019

(65) Prior Publication Data

US 2020/0123032 A1 Apr. 23, 2020

Related U.S. Application Data (62) Division of application No. 15/266,335, filed on Sep. 15, 2016, now abandoned.

(60) Provisional application No. 62/220,399, filed on Sep. 18, 2015.

(51) Int. Cl.
| | |
|---|---|
| C02F 1/52 | (2006.01) |
| C02F 5/10 | (2006.01) |
| C02F 1/68 | (2006.01) |
| C02F 101/10 | (2006.01) |
| C02F 103/08 | (2006.01) |

(52) U.S. Cl.
CPC ............ *C02F 1/5272* (2013.01); *C02F 1/683* (2013.01); *C02F 5/10* (2013.01); *C02F 2101/101* (2013.01); *C02F 2103/08* (2013.01); *C02F 2303/22* (2013.01)

(58) Field of Classification Search
CPC ...................................................... C02F 1/5272
See application file for complete search history.

(56) References Cited

U.S. PATENT DOCUMENTS

| | | | |
|---|---|---|---|
| 4,708,805 A | 11/1987 | D'Muhala | |
| 5,302,297 A | 4/1994 | Barthrope | |
| 7,098,663 B1 | 8/2006 | Bader | |
| 2003/0093982 A1* | 5/2003 | Suwabe | B01D 46/2459 55/523 |
| 2012/0160777 A1* | 6/2012 | Wahid | C02F 1/5236 210/714 |
| 2014/0008305 A1 | 1/2014 | Nichols et al. | |
| 2016/0060133 A1* | 3/2016 | Vollmer | C02F 1/5236 210/702 |

(Continued)

FOREIGN PATENT DOCUMENTS

| | | |
|---|---|---|
| WO | 2012087887 | 6/2012 |

OTHER PUBLICATIONS

Custelcean et al., "Aqueous Sulfate Separation by Crystallization of Sulfate-Water Clusters," Angew. Chem. Int. Ed., published in 2015, vol. 54, pp. 10525-10529.

(Continued)

*Primary Examiner* — Peter Keyworth
(74) *Attorney, Agent, or Firm* — Fish & Richardson P.C.

(57) ABSTRACT

A method includes mixing seawater with a two-part additive system configured to precipitate sulfate from the seawater; removing the sulfate precipitates from the seawater; and delivering the seawater into an oilfield reservoir.

15 Claims, 3 Drawing Sheets

(56) References Cited

U.S. PATENT DOCUMENTS

2016/0256583 A1    9/2016  Yamada

OTHER PUBLICATIONS

Jia et al., "Highly Efficient Extraction of Sulfate Ions with a Tripodal Hexaurea Receptor," Angew. Chem. Int. Ed., published in 2011, vol. 50, pp. 486-490.
Moyer, "A Case for Molecular Recognition in Nuclear Separations: Sulfate Separation from Nuclear Wastes," Inorganic Chemisty, copyright 2012, pp. 3473-3490.
Rajbanshi et al., "Sulfate Separation from Aqueous Alkaline Solutions by Selective Crystallization of Alkali Metal Coordination Capsules," Cryst. Growth Des., published in 2011, pp. 2702-2706.
European Communication under Rule 71(3) EPC issued in European Application No. 16771064.9 dated Feb. 27, 2019, 26 pages.
Gulf Cooperation Council Examination Report issued in GCC Application No. GC 2016-32024 dated Nov. 18, 2018.
Gulf Cooperation Council Examination Report issued in GCC Application No. GC 2016-32024 dated May 7, 2019, 3 pages.
International Search Report and Written Opinion of the International Searching Authority issued in International Application No. PCT/US2016/052066 dated Nov. 4, 2016; 11 pages.

\* cited by examiner

TREATING SEAWATER FOR OILFIELD OPERATIONS

CLAIM OF PRIORITY

This application is a divisional of and claims the benefit of priority to U.S. patent application Ser. No. 15/266,335, filed Sep. 15, 2016, which claims priority to U.S. Provisional Patent Application Ser. No. 62/220,399, filed on Sep. 18, 2015, the entire contents of which are incorporated here by reference.

TECHNICAL FIELD

This disclosure relates to treating seawater for oilfield operations, for example, treating seawater for use in hydraulic fracturing of hydrocarbon reservoirs.

BACKGROUND

Unconventional hydrocarbon reservoirs are reservoirs with trapped hydrocarbons (for example, oil, natural gas, or combinations of them) in which the hydrocarbon mobility is limited. Extraction of hydrocarbons from such reservoirs typically involves increasing the mobility of the hydrocarbons, for example, by hydraulic fracturing. In hydraulic fracturing, a fracturing fluid (for example, proppants and one or more chemicals in an aqueous or non-aqueous base fluid) is flowed through the hydrocarbon reservoir. The fracturing fluid fractures the reservoir rock to increase mobility of the trapped hydrocarbons. Significant amounts of water can be required for hydraulic fracturing processes.

SUMMARY

This disclosure relates to increasing oilfield efficiencies, particularly hydraulic fracturing in hydrocarbon rock reservoirs, by treating seawater. In some cases, the hydraulic fracturing can be in unconventional rock reservoirs. The use of seawater can avoid depleting local sources of freshwater. In some cases, hydraulic fracturing efficiencies can be improved by treating salt water to remove sulfate ions. Sulfate ions can react with certain cations present in rock formations to precipitate in the rock formation as scale (e.g., as calcium sulfate, barium sulfate), which can damage the formation and reduce the amount of accessible hydrocarbons. Because significant amounts of water can be required for certain hydraulic fracturing operations, the treatment of seawater provided herein can maintain the yield of hydraulic fracturing operations performed using freshwater but avoid using up fresh water resources. Additionally, treatment processes provided herein can reduce the sulfate concentration in seawater more quickly and with a reduced energy expenditure as compared to traditional desalination techniques.

In an aspect, a method includes mixing seawater with a two-part additive system configured to precipitate sulfate from the seawater; removing the sulfate precipitates from the seawater; and delivering the seawater into an oilfield reservoir.

Embodiments can include one or more of the following features.

The two-part additive system is configured to cause formation of crystalline sulfate precipitates.

The two-part additive system comprises aminoguanidine hydrochloride.

The two-part additive system comprises glyoxal.

The two-part additive system comprises a guanidine compound.

The two-part additive system comprises a hydrazine compound.

The two-part additive system comprises an aldehyde molecule.

The two-part additive system comprises a dialdehyde molecule.

The two-part additive system comprises a dicarbonyl molecule.

The two-part additive system comprises an additive having the following structure, and in which each R1 is independently be selected from H or any carbon chain and L is a direct link or any suitable molecular linkage:

A concentration of sulfate in the treated seawater is less than 0.02 M.

A concentration of sulfate in the treated seawater is lower than a solubility level of sulfate in the treated seawater.

The seawater does not contain a scale inhibitor.

Removing the sulfate precipitates from the seawater comprises filtering the seawater using a filter having a pore size of at least 0.5 mm.

In an aspect, a treated seawater composition includes seawater; aminoguanidine hydrochloride; and glyoxal.

Embodiments can include one or more of the following features.

The composition comprises precipitated sulfate crystals and less than 0.02 M sulfate ions in the aqueous phase.

The composition comprises less than 0.01 M sulfate ions.

The composition comprises less than 0.005 M sulfate ions.

The composition contains complexes of the aminoguanidine hydrochloride, glyoxal, and chloride ions.

In an aspect, an additive system for treating seawater includes aminoguanidine hydrochloride and glyoxal.

In an aspect, a composition includes water and precipitated complexes of sulfate ions, a first additive, and a second additive.

Embodiments can include one or more of the following features.

The first additive comprises aminoguanidine hydrochloride and the second additive comprises glyoxal.

The first additive is selected from a guanidine or a hydrazine compound and the second additive is selected from an aldehyde, a dialdehyde, or a dicarbonyl.

The water is seawater.

The precipitates have an average length of at least 2 mm.

The precipitates are crystalline.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
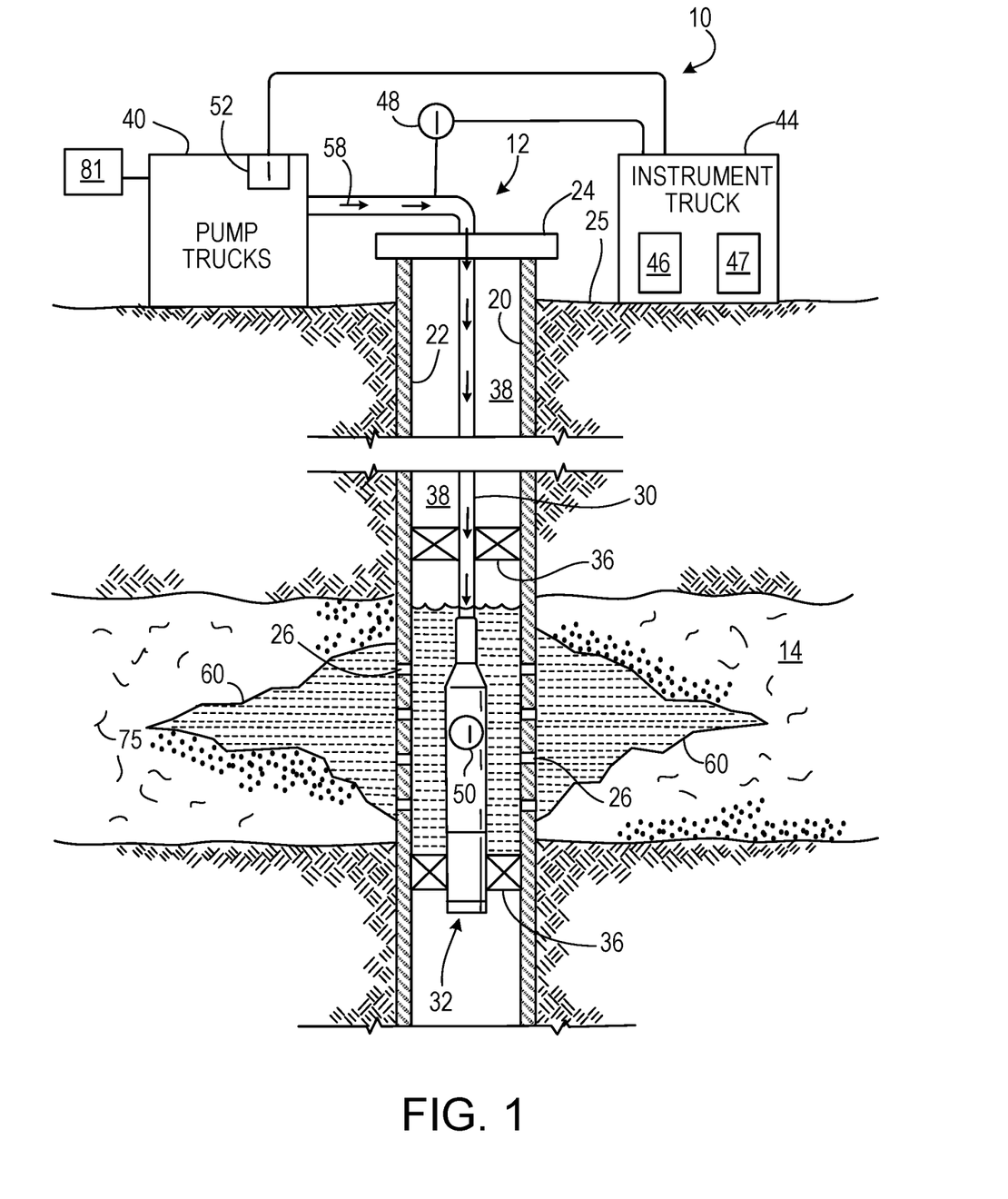
FIG. 1 shows an example of a fracture treatment for a well.

FIG. 1 illustrates an example of a fracture treatment 10 for a well 12. The well 12 can be a reservoir or formation 14, for example, an unconventional reservoir in which recovery operations in addition to conventional recovery operations are practiced to recover trapped hydrocarbons. Examples of unconventional reservoirs include tight-gas sands, gas and oil shales, coalbed methane, heavy oil and tar sands, gas-hydrate deposits, to name a few. In some implementations, the formation 14 includes an underground formation of naturally fractured rock containing hydrocarbons (for example, oil, gas or both). For example, the formation 14 can include a fractured shale. In some implementations, the well 12 can intersect other suitable types of formations 14, including reservoirs that are not naturally fractured in any significant amount.

The well 12 can include a well bore 20, casing 22 and well head 24. The well bore 20 can be a vertical or deviated bore. The casing 22 can be cemented or otherwise suitably secured in the well bore 12. Perforations 26 can be formed in the casing 22 at the level of the formation 14 to allow oil, gas, and by-products to flow into the well 12 and be produced to the surface 25. Perforations 26 can be formed using shape charges, a perforating gun or otherwise.

For the fracture treatment 10, a work string 30 can be disposed in the well bore 20. The work string 30 can be coiled tubing, sectioned pipe or other suitable tubing. A fracturing tool 32 can be coupled to an end of the work string 30. Packers 36 can seal an annulus 38 of the well bore 20 above and below the formation 14. Packers 36 can be mechanical, fluid inflatable or other suitable packers.

One or more pump trucks 40 can be coupled to the work string 30 at the surface 25. The pump trucks 40 pump fracture fluid 58 down the work string 30 to perform the fracture treatment 10 and generate the fracture 60. The fracture fluid 58 can include a fluid pad, proppants and/or a flush fluid. The fracture fluid 58 can include treated seawater as provided herein. The pump trucks 40 can include mobile vehicles, equipment such as skids or other suitable structures.

One or more instrument trucks 44 can also be provided at the surface 25. The instrument truck 44 can include a fracture control system 46 and a fracture simulator 47. The fracture control system 46 monitors and controls the fracture treatment 10. The fracture control system 46 can control the pump trucks 40 and fluid valves to stop and start the fracture treatment 10 as well as to stop and start the pad phase, proppant phase and/or flush phase of the fracture treatment 10. The fracture control system 46 communicates with surface and/or subsurface instruments to monitor and control the fracture treatment 10. In some implementations, the surface and subsurface instruments may comprise surface sensors 48, down-hole sensors 50 and pump controls 52.

A quantity of energy applied by the fracture control system 46 to generate the fractures 60 in the reservoir or formation 14 can be affected not only by the properties of the reservoir rock in the formation but also by the formation of scale in the formation as components of the fracture fluid 58 react with certain constituents present in the rock.

Chemical additives 81 can be mixed with fracture fluid 58 and flowed through the reservoir. Fracture fluid 58 can include treated seawater, such as seawater having been treated to remove sulfate ions. The treated seawater can have less than 0.02 M of sulfate ions, less than 0.01 M of sulfate ions, less than 0.005 M sulfate ions, or a lower concentration of sulfate ions. For instance, the seawater can have been treated with a two-part additive system that causes sulfate ions to precipitate from the seawater. The removal of sulfate ions from the seawater prior to use of the seawater in an oilfield operation can help prevent scale formation, thus reducing damage to the formation and enabling larger amounts of hydrocarbons to be accessed.

There are various methods that can be used to determine the amount of sulfate ions that were removed from seawater. One example method is to analyze the concentration of sulfur in the liquid by analytical methods such as inductively coupled plasma (ICP) before and after the treatment. The concentration of sulfur is directly related to the concentration of sulfate because there are typically no other sulfur-based chemical compounds in seawater. A second example method is to isolate the crystals that are formed, weigh them, and calculate the amount of sulfate based on the stoichiometry of the known compound. The other anions present in the seawater such as chloride are not removed by this method. A product complex can form with chloride in solution, but it is fully soluble and does not precipitate. The cations such as sodium and potassium are not removed from the seawater by this method. Typically chloride, sodium, and potassium are not problematic ions in terms of scale formation because these ions tend to form soluble salts.

In some implementations, other additives can be added to the treated seawater prior to use in an oilfield operation (for instance, hydraulic fracturing). In some cases, the treated seawater can be combined with a friction reducer. In some implementations, persulfates can be used for lower temperature formations while, in other implementations, bromates can be used for higher temperature formations.

In an example, the seawater available around Qurayyah, Saudi Arabia contains around 0.04 M sulfate ions. When sulfate ions combine with calcium or barium downhole in the formation, calcium or barium sulfate can precipitate, clogging or damaging the formation. At room temperature, calcium sulfate will precipitate if the concentrations of calcium and sulfate are greater than about 0.02 M, and barium sulfate will precipitate if the concentrations of barium and sulfate are greater than about $1 \times 10^{-5}$ M. At elevated temperature downhole the solubilities of calcium sulfate and barium sulfate will be slightly higher but generally on the same order of magnitude. In some cases, scale inhibitor additives can be added to seawater to prevent sulfate precipitation during hydraulic fracturing operations. Methods provided herein, however, can reduce or minimize the precipitation of solids within the formation even without the use of scale inhibitor additives.

An additive configured to cause sulfate ions in the seawater to precipitate can be added to the seawater prior to use in a hydrocarbon rock reservoir. The precipitates can be removed from the seawater, such as by filtering the precipitates out of the treated seawater. The precipitates can be crystalline.

In some cases, the additive can be a multi-part additive, such as a two-part additive, a three-part additive, or an additive with more than three parts. In some cases, a first additive of a multi-part additive can be dissolved into the seawater followed by adding a second additive of the multi-part additive. In some cases, the first additive can react with the second additive when in solution in the seawater to preferentially congregate with sulfate ions and form sulfate precipitates. The crystallization of sulfate from seawater is generally strongly inhibited by the presence of other ions in seawater, such as divalent cations such as Ca2+, Mg2+, or other ions. The use of a multi-part additive, such as a two-part additive, can help to mitigate the effects of the divalent cations when attempting to remove sulfate from seawater.

In a specific example, a two part additive system can include aminoguanidine hydrochloride (hereinafter "AG HCl") as the first additive and glyoxal as the second additive. In some cases, aminoguanidate hydrochloride is first dissolved in the seawater, and then glyoxal, predissolved in water, is added to the seawater to form crystalline sulfate precipitates in minutes, hours, or days. Aminoguanidine hydrochloride can have the following structure:

Glyoxal can have the following structure:

The aminoguanidine hydrochloride and the glyoxal in solution can react in the seawater, causing the sulfate to precipitate as sulfate precipitates, such as glyoxal bis(amidiniumhydrazone) sulfate, which can have the following structure:

In some cases, the two part additive system can include other additives adapted to react with each other and form an ion that preferentially congregates with sulfate ions to from sulfate precipitates. In some cases, the first additive can include a guanidine compound. In some cases, the first additive can include a hydrazine compound. In some cases, the second additive can include a dicarbonyl compound having the following structure:

Each $R^1$ of the dicarbonyl compound can be independently selected from a hydrogen atom or any hydrocarbon chain and the L of the dicarbonyl compound can be a direct bond or any set of linking elements. In some cases, each $R^1$ can be selected from H, $-CH_3$, $-C_2H_5$, $-C_3H_7$, $-C_4H_9$, or $-C_5H_{11}$. In some cases, L can be selected from a direct link, $-CH_2-$, $-C_2H_4-$, $-C_3H_6-$, $-C_4H_8-$, or $-C_5H_{10}-$. In some cases, the second additive can include glutaraldehyde.

The higher the concentration of sulfate in the seawater and the greater the amount of additives added, the faster the precipitation process occurs. Slow crystallization encourages the formation of larger crystals of the sulfate precipitate. The crystals formed can be needle-like with diameters on the order of microns to millimeters and lengths up to 1 cm. In some cases, the crystals can be filtered out or otherwise separated from the aqueous phase. In some cases, the aqueous phase of the treated seawater can have a concentration of sulfate ions of 0.02 M or less. In some cases, the treated seawater can have a concentration of sulfate ions of 0.01 M or less. In some cases, the treated seawater can have a concentration of sulfate ions of 0.005 M or less. In some cases, the concentration of sulfate ions in the treated seawater can be below a solubility level of sulfate ions in the seawater. After treatment and removal of the sulfate precipitates, the treated seawater can be delivered into the reservoir rock formation as part of a hydraulic fracture treatment.

Sulfate precipitates from the treated seawater can be removed using any suitable method. In some cases, sulfate precipitates can have a needle-like shape. In some cases, the precipitates can have an average diameter of between about 0.1 mm and about 1 mm and an average length of at least about 1 mm. In some cases, the precipitates can have a diameter of between 0.1 mm and 0.5 mm and an average length of at least 2 mm. In some cases, the precipitates can have a length of at least 5 mm. In some cases, the precipitates can have a length of between 2 mm and 10 mm. The precipitate sizes can be determined by direct visualization by eye or under a microscope or by using a particle size analyzer, when they are too small to measure, or by another measurement method. In some cases, methods provided herein can remove precipitates from the treated seawater by filtering the treated seawater. In some cases, methods provided herein can allow for precipitates to form in the treated seawater for at least 1 minute between adding the additive to the seawater and filtering the seawater. The precipitation time can vary based on the concentrations of both the sulfate and the additives. The precipitation time can be as short as a few minutes or up to a day based on the conditions.

This, and other aspects, can include one or more of the following features. The treated seawater can have a sulfate concentration of less than about 0.02 M and can be used as a hydraulic fracture fluid, a pad fluid that is flowed into the reservoir before a hydraulic fracture fluid, or a combination of them. In some cases, additional additives can be added to the treated seawater to use the treated seawater as a hydraulic fracturing fluid or a pad fluid. In some cases, a scale inhibitor can be added to the treated seawater.

Figure 2:
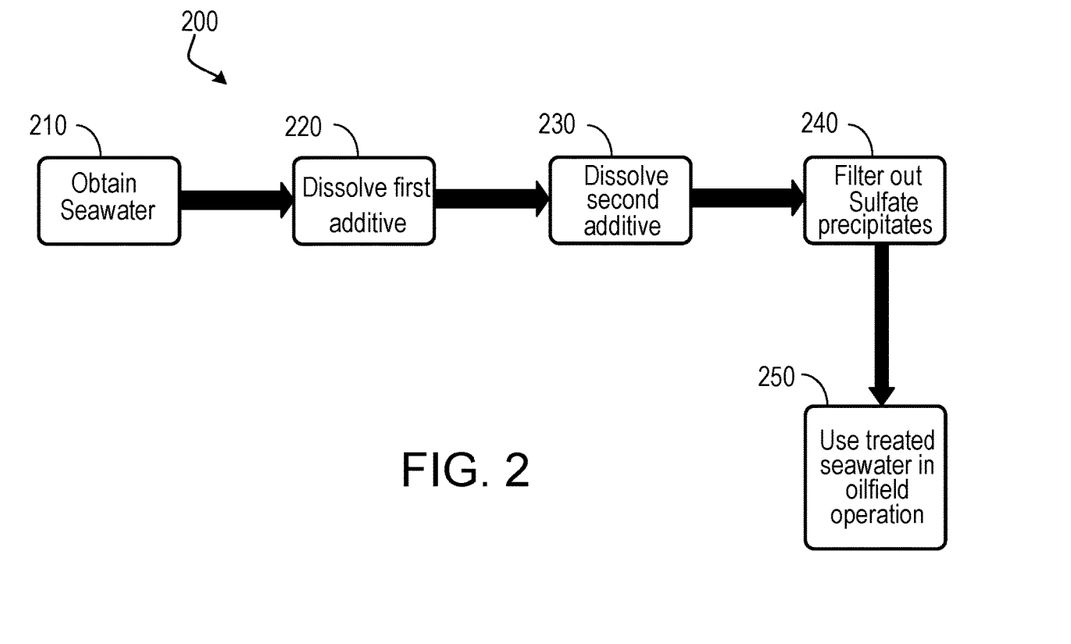
FIG. 2 is a flowchart of an example of a process for treating seawater for use as a hydraulic fracture fluid.

FIG. 2 is a flowchart of an example of a process 200 for treating seawater to remove sulfate ions. At 210, seawater is obtained using any suitable transportation method. In some cases, seawater can be pumped directly from an ocean, a gulf, or a saltwater lake. In some cases, seawater can be delivered by tanker truck.

At 220, a first additive is dissolved in the seawater. In some cases, the first additive can be a guanidine compound, such as aminoguanidine hydrochloride. In some cases, the first additive can be a hydrazine compound.

At 230, a second additive is mixed with the seawater including the first additive. The first additive and the second additive are collectively referred to as a two-part additive system. In some cases, the second additive can be glyoxal. In some cases, the glyoxal can be predissolved in water prior to being mixed with the seawater including the first additive. In some cases, the glyoxal added to the seawater can be an aqueous solution including 40% glyoxal in water. In some cases, the second additive can include one or more of a dicarbonyl molecule, an aldehyde molecule, and a dialdehyde molecule.

When the second additive is added, sulfates can begin to precipitate. In some cases, the mixing of additives can be controlled such that the sulfate precipitates have a length of at least 2 mm. At 240, the treated seawater is filtered to remove the sulfate precipitates. A filter used to remove the sulfate precipitates from the treated seawater can have a pore size on the same order as a dimension, such as a length or diameter, of the sulfate precipitates. For instance, a filter having a pore size of at least about 0.5 mm can be used, such as a pore size of about 0.5 mm, about 1 mm, about 2 mm, or another size. The treated seawater can have a concentration of sulfate ions of less than about 0.02 M, less than 0.01 M, less than 0.005 M, or a lower concentration. At 250, the treated seawater is used in an oilfield operation.

Experimental Results

Experiments were conducted to evaluate the ability of aminoguanidine hydrochloride (hereinafter "AG HCl") and Glyoxal (40% in water) to precipitate sulfate ions. Table 1 below depicts the results of these experiments, which were all conducted at room temperature.

Multiple types of sulfate solution were prepared. A sodium sulfate solution was prepared by dissolving sodium sulfate ($Na_2SO_4$) in water resulting in a sulfate concentration of 0.043 M to simulate seawater s. Synthetic Qurayyah (Saudi Arabia) seawater fluids containing sulfate ions as well as additional ions such as $Ca^{2+}$, $Na^+$, or other ions were also prepared. The synthetic seawater fluids were prepared by dissolving the following compounds in 1 L of water resulting in the ion concentrations shown.

43.141 g sodium chloride
1.356 g potassium chloride
2.793 g calcium chloride dihydrate
8.157 g magnesium chloride
0.165 g sodium bicarbonate
6.153 g sodium sulfate anhydrous
19.279 g sodium ion (0.839 M Na)
840 mg bicarbonate ion (0.0138 M HCO3)
4.161 g sulfate ion (0.0433 M SO4)
711 mg potassium ion (0.0182 M K)
2.083 g magnesium ion (0.0857 M Mg)
622 mg calcium ion (0.0155 M Ca)
33.440 g chloride ion (0.943 M Cl)

Aminoguanidine hydrochloride (AG HCl) was then dissolved in 10 mL of sulfate solution (either just sodium sulfate or synthetic Qurayyah seawater) with a molar ratio of AG HCl to sulfate of about 2:1. Glyoxal (40% in water) was then added to the AG HCl and sulfate solution with a molar ratio of glyoxal to sulfate of about 1:1. The solution was briefly mixed and set aside until crystal precipitation occurred. The dimensions of the resulting crystals were estimated by visualization, and the amount of sulfate that remained in the fluid was determined by inductively coupled plasma (ICP).

A series of crystallization experiments were performed to compare the precipitation of sulfate from solutions containing synthetic Qurayyah seawater, synthetic Qurayyah seawater without added calcium or magnesium ions, synthetic Qurayyah seawater with ethylenediaminetetraacetic acid (EDTA), synthetic Qurayyah seawater with citric acid, and solutions containing only sodium sulfate as the sulfate source. EDTA is a chelating agent that binds to calcium and magnesium, thus reducing the concentration of calcium and magnesium ions in the synthetic seawater.

Results of these experiments are shown in Table 1. The yield of sulfate-bearing crystals was significantly lower in solutions containing calcium and magnesium ions, thus indicating that the crystallization of the sulfate complex is hindered by the presence of other ions, such as calcium and magnesium, in the solution. The inclusion of EDTA, which binds to calcium and magnesium, in the synthetic seawater improved the yield of sulfate-containing crystals and resulted in a concentration of residual sulfate of about 0.015 M, which is lower than the target concentration of 0.02 M. The inclusion of citric acid, which is a less expensive alternative to EDTA, in the synthetic seawater also improved the yield of sulfate-containing crystals and resulted in a concentration of residual sulfate of about 0.011 M. In comparison, the concentration of residual sulfate in synthetic Qurayyah seawater (without added EDTA or citric acid) was about 0.024 M.

TABLE 1

Sulfate crystallization from synthetic Qurayyah seawater with added AG HCl and glyoxal.

| Source | $[SO_4^{2-}]$ (M) | AG HCl (mol) | Glyoxal (mol) | Crystal Length (mm) | Time to Form (hours) | $SO_4^{2-}$ After (ppm) | $SO_4^{2-}$ After (M) |
|---|---|---|---|---|---|---|---|
| $Na_2SO_4$ | 0.043 | 0.001 | 0.0005 | 6 | <1 | 689 | 0.007 |
| Qurayyah | 0.043 | 0.001 | 0.0005 | 2 | 24 | 2347 | 0.024 |
| Qurayyah (No $Ca^{2+}$, $Mg^{2+}$) | 0.043 | 0.001 | 0.0005 | 3 | 3 | 1266 | 0.013 |
| Qurayyah + EDTA | 0.043 | 0.001 | 0.0005 | 4 | 4 | 1446 | 0.015 |
| Qurayyah + citric acid | 0.043 | 0.001 | 0.0005 | 3 | 96 | 1031 | 0.011 |

The sulfate recovery rate can also be improved by increasing the concentration of AG HCl, glyoxal, or both. For instance, increasing the concentration of both AG HCl and glyoxal by a factor of two significantly improves the yield of sulfate-bearing crystals, as shown in Table 2.

TABLE 2

Sulfate crystallization from synthetic Qurayyah seawater with increased concentration of added AG HCl and glyoxal.

| Source | [$SO_4^{2-}$] (M) | AG HCl (mol) | Glyoxal (mol) | Crystal Length (mm) | Time to Form (hours) | $SO_4^{2-}$ After (ppm) | $SO_4^{2-}$ After (M) |
|---|---|---|---|---|---|---|---|
| $Na_2SO_4$ | 0.043 | 0.002 | 0.001 | 6 | 1 | 167 | 0.002 |
| Qurayyah | 0.043 | 0.002 | 0.001 | 3 | 24 | 612 | 0.006 |
| Qurayyah (No $Ca^{2+}$, $Mg^{2+}$) | 0.043 | 0.002 | 0.001 | 2 | <1 | 334 | 0.003 |
| Qurayyah + EDTA | 0.043 | 0.002 | 0.001 | 3 | 4 | 477 | 0.005 |
| Qurayyah + citric acid | 0.043 | 0.002 | 0.001 | 2 | 96 | 470 | 0.005 |

In order to assess the scale-up potential of this approach to removing sulfate from seawater, the quantity of synthetic Qurayyah seawater with EDTA was increased 50-fold to 5 L. Similar to the experiments described supra, the AG HCl was dissolved and the glyoxal was then added to the solution. The results of this experiment are shown in Table 3. The final concentration of sulfate was 0.012 M, which is even lower than when the experiment was performed at small scales, when the final concentration of sulfate was 0.015 M. The precipitate was highly crystalline even though the crystallization process was initially rapid.

TABLE 3

Sulfate crystallization from 5 L of Qurayyah seawater.

| Source | [$SO_4^{2-}$] (M) | AG HCl (mol) | Glyoxal (mol) | Crystal Length (mm) | Time to Form (hours) | $SO_4^{2-}$ After (ppm) | $SO_4^{2-}$ After (M) |
|---|---|---|---|---|---|---|---|
| Qurayyah + EDTA | 0.043 | 0.05 | 0.025 | 3 | 1-24 | 1152 | 0.012 |

Figure 3:
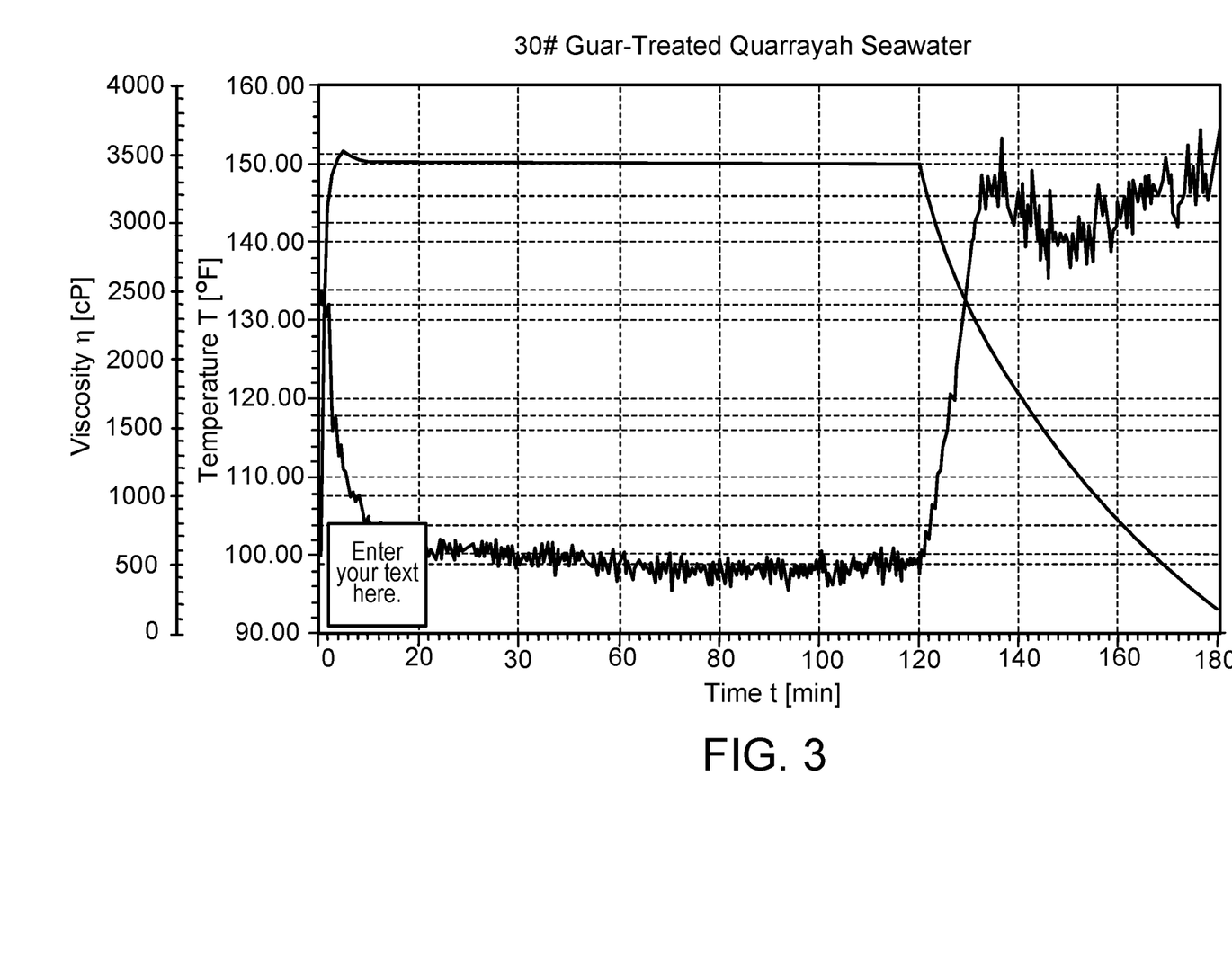
FIG. 3 is a plot of viscosity of treated seawater over time.

To demonstrate that the treated seawater can be used for hydraulic fracturing, a guar-based fracturing fluid was prepared from the treated synthetic Qurayyah seawater after separating the liquid from the precipitated sulfate crystals. First, 30 pounds (equivalent) of guar was hydrated in the treated seawater. The pH was adjusted and the guar was crosslinked with borate crosslinker. The viscosity of the fluid was then measured by a rheometer at 150° F. for 90 minutes. The results of the viscosity measurement are shown in FIG. 3. The gel viscosity was stable over this time period, indicating that the treated seawater can be used as a stable fracturing fluid.

In sum, this specification describes transforming seawater to remove sulfate ions.

Thus, particular implementations of the subject matter have been described. Other implementations are within the scope of the following claims.

The invention claimed is:

1. A method comprising:
adding a chelating agent to seawater comprising sulfate ions and divalent cations to reduce a concentration of the divalent cations in the seawater, thereby reducing an interference by the divalent cations on crystallization of the sulfate ions, the chelating agent comprising ethylenediaminetetraacetic acid (EDTA) or citric acid;
after adding the chelating agent to the seawater, mixing the seawater with a two-part additive system to precipitate the sulfate ions from the seawater, wherein the two-part additive system comprises aminoguanidine hydrochloride and glyoxal;
removing the sulfate precipitates from the seawater; and
delivering the seawater into an oilfield reservoir.

2. The method of claim 1, wherein mixing the seawater with the two-part additive system causes the formation of crystalline sulfate precipitates having an average diameter of at least 0.1 mm and an average length of at least 1 mm.

3. The method of claim 1, wherein a molar ratio of the aminoguanidine hydrochloride to the sulfate ions in the seawater is about 2:1 or greater.

4. The method of claim 1, wherein a molar ratio of the glyoxal to the sulfate ions in the seawater is about 1:1 or greater.

5. The method of claim 1, wherein the two-part additive system further comprises a hydrazine compound.

6. The method of claim 1, wherein the two-part additive system further comprises an aldehyde molecule.

7. The method of claim 1, wherein the two-part additive system further comprises a dialdehyde molecule.

8. The method of claim 1, wherein the two-part additive system further comprises a dicarbonyl molecule.

9. The method of claim 1, wherein the two-part additive system further comprises an additive having the following structure:

wherein each $R^1$ is independently be selected from H or any carbon chain and L is a direct link or any suitable molecular linkage.

10. The method of claim 1, wherein after the sulfate precipitates have formed, a concentration of the sulfate ions in the treated seawater is less than 0.02 M.

11. The method of claim 10, wherein the concentration of the sulfate ions in the treated seawater is lower than a solubility level of sulfate in the treated seawater.

12. The method of claim 1, wherein the seawater does not contain a scale inhibitor.

13. The method of claim 1, wherein removing the sulfate precipitates from the seawater comprises filtering the seawater using a filter having a pore size of at least 0.5 mm.

14. The method of claim 1, wherein the chelating agent comprises ethylenediaminetetraacetic acid (EDTA).

15. The method of claim 1, wherein the chelating agent comprises citric acid.

* * * * *